United States Patent Office 3,300,488
Patented Jan. 24, 1967

---

3,300,488
N,N'-BIS[4-(4-HALOGENATED-5-ALKYL-3-ISOXA-ZOLYLSULFAMOYL)-PHENYL]-UREAS
Hiroshi Onoue, Nishinomiya-shi, Japan, assignor to Shionogi & Co., Ltd., Osaka, Japan
No Drawing. Filed Nov. 12, 1964, Ser. No. 410,754
Claims priority, application Japan, Dec. 23, 1963, 38/69,570
2 Claims. (Cl. 260—239.9)

The present invention relates to novel intermediates in a process for preparing isoxazole derivatives of sulfanilamide. More particularly, it relates to novel intermediates in an improved process for preparing 4-halogenated or unhalogenated 3-sulfanilamido-5-alkylisoxazoles.

The aforesaid process comprises (1) condensing a 4-halogenated or unhalogenated 3-amino-5-alkylisoxazole (hereinafter referred to as "aminoisoxazole") represented by the formula:

wherein R is a lower alkyl group (e.g. methyl, ethyl, propyl) and X is a holagen atom (e.g. chlorine, bromine, iodine) with an N,N'-bis(halogenosulfonylphenyl)-urea (hereinafter referred to as "bisphenylurea") represented by the formula:

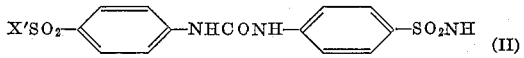

wherein X' is a halogen atom (e.g. chlorine, bromine, iodine) and (2) hydrolyzing the resultant N,N'-bis[4-(4-halogenated or unhalogenated 5-alkyl-3-isoxazolylsulfamoyl)-phenyl]-urea (hereinafter referred to as "bissulfamoylphenylurea") represented by the formula:

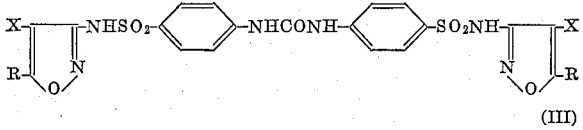

wherein R and X have each the same significance as designated above, with an acid or an alkali to give the 4-halogenated or unhalogenated 3-sulfanilamido-5-alkyl-isoxazole (hereinafter referred to as "sulfanilamide") represented by the formula:

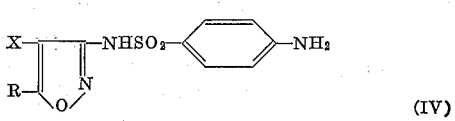

wherein R and X have each the same significance as designated above.

The one starting material is the aminoisoxazole (I) of which specific examples include 3-amino-5-methylisoxazole, 3-amino-5-ethylisoxazole, 3-amino-5-propylisoxazole, 3-amino-4-chloro-5-methylisoxazole, 3-amino-4-bromo-5-methylisoxazole, 3-amino-4-iodo-5-methylisoxazole, 3-amino-4-bromo-5-ethylisoxazole, 3-amino-4-iodo-5-ethylisoxazole, 3-amino-4-iodo-5-propylisoxazole and the like. The other starting material is the bisphenylurea (II) such as N,N'-bis(4-chlorosulfonylphenyl)-urea and N,N'-bis(4-bromosulfonylphenyl)-urea, which can be prepared by reacting diphenyl urea with a halogenosulfonic acid (e.g. chlorosulfonic acid, bromosulfonic acid).

The said two starting materials are firstly subjected to condensation. The reaction may be effected by treating the aminoisoxazole (I) with the bisphenylurea (II) in an inert solvent, preferably in the presence of an organic or inorganic base. The inert solvent is required to be able to dissolve at least one of the starting materials and may be generally selected from lower alkanols (e.g. methanol, ethanol), lower aliphatic ketones (e.g. acetone, methyl ethyl ketone), aromatic hydrocarbons (e.g. benzene, toluene), aliphatic esters (e.g. methyl acetate, ethyl acetate), ethers (e.g. diethyl ether), cyclic ethers (e.g. dioxane, tetrahydrofuran), halogenoalkanes (e.g. chloroform, dichloroethane, carbon tetrachloride) and the like. Examples of the organic and inorganic bases are pyridine bases (e.g. pyridine, picoline, lutidine, collidine), trialkylamines (e.g. triethylamine), alkali metal carbonates (e.g. sodium carbonate, potassium carbonate), alkaline earth metal carbonates (e.g. calcium carbonate, barium carbonate), etc. These basic substances may be used in the form of mixture, suspension or solution in the said inert organic solvent or, in the case of liquid, alone. The reaction temperature may be correlated to the starting materials and/or the reaction medium and generally is from about 10 to about 80° C.

The resulting bissulfamoylphenylurea (III) is next subjected to hydrolysis. The reaction may be effected by treating the bissulfamoylphenylurea (III) with an acid (e.g. hydrochloric acid, sulfuric acid) or an alkali (e.g. sodium hydroxide, potassium hydroxide) in an aqueous medium while heating, usually refluxing.

Although the condensation step and the hydrolysis step have been hereinabove illustrated separately, these steps may be carried out succeedingly without isolation of the intermediarily produced bissulfamoylphenylurea (III).

Examples of the sulfanilamide (IV) thus produced are 3-sulfanilamido-5-methylisoxazole,
3-sulfanilamido-5-ethylisoxazole,
3-sulfanilamido-5-propylisoxazole,
3-sulfanilamido-4-chloro-5-methylisoxazole,
3-sulfanilamido-4-bromo-5-methylisoxazole,
3-sulfanilamido-4-iodo-5-methylisoxazole,
3-sulfanilamido-4-iodo-5-ethylisoxazole,
3-sulfanilamido-4-bromo-5-propylisoxazole,
3-sulfanilamido-4-iodo-5-propylisoxazole, etc.

These sulfanilamides are known and useful as sulfa-drugs [U.S. Patent Nos. 2,888,455 and 3,144,448].

Hitherto, the said sulfanilamide (IV) has been produced the most ordinarily and preferably by condensing the aminoisoxazole (I) with p-acylaminobenzenesulfonyl halide in the presence of a base in an inert solvent and hydrolyzing the resultant 4-halogenated or unhalogenated 3-(p-acylaminobenzenesulfonylamino) - 5 - alkylisoxazole with an acid or an alkali in an aqueous medium. In comparison with such known process, the present process is industrially advantageous. For instance, the bisphenylurea (II) used as the starting material in the present process is generally available at a lower cost than p-acyl-aminobenzenesulfonyl halide used as the corresponding starting material in the known process. Further, for instance, the condensation of the aminoisoxazole (I) wherein the 4-position is occupied by a halogen atom with p-acylaminobenzenesulfonyl halide in the known process proceeds with the inevitable by-production of 3-bis(p-acylsulfanil)-amido-4-halogeno - 5 - alkylisoxazole. Although this substance is hydrolyzed to give the objective 3-sulfanilamido-4-halogeno - 5 - alkylisoxazole, one molar amount of p-acylaminobenzenesulfonyl halide is wasted. Such side reaction does not proceed in the present process and, therefore, the bisphenylurea (II) is not wasted.

Presently-preferred embodiments of the present invention are illustratively shown in the following examples. In these examples, the relationship of parts by weight to parts by volume is the same as that between grams and milliliters. Temperatures are set forth in degrees centigrade.

Example 1

To a solution of 3-amino-5-methylisoxazole (100 parts by weight) in pyridine (200 parts by volume), there is added N,N'-bis(4-chlorosulfonylphenyl)-urea (230 parts by weight), and the resultant mixture is heated at 50° C. for 2 hours. The reaction mixture is combined with water (3000 parts by volume). The separated substance is collected by filtration and washed with water to give N,N'-bis-[4-(5-methyl - 3 - isoxazolylsulfamoyl)phenyl]-urea as crude crystals. The crystals are dissolved in 10% aqueous sodium hydroxide solution (4000 parts by volume) and refluxed for 3 hours. The reaction mixture is treated with activated carbon and filtered. The filtrate is acidified with hydrochloric acid. The separated crystals are collected by filtration and recrystallized from methanol to give 3-sulfanilamido-5-methylisoxazole (250 parts by weight) as crystals melting at 168° C.

Example 2

To a solution of 3-amino-5-ethylisoxazole (115 parts by weight) in pyridine (220 parts by volume), there is added N,N'-bis(4-chlorosulfonylphenyl)-urea (230 parts by weight), and the resultant mixture is heated at 50° C. for 2 hours. The reaction mixture is combined with water (2500 parts by volume). The separated substance is collected by filtration and washed with water to give N,N'-bis[4-(5-ethyl-3-isoxazolylsulfamoyl)phenyl] - urea as crude crystals. The crystals are dissolved in 10% aqueous sodium hydroxide solution (4000 parts by volume) and refluxed for 3 hours. The reaction mixture is treated with activated carbon and filtered. The filtrate is acidified with hydrochloric acid. The separated crystals are collected by filtration and recrystallized from ethanol to give 3-sulfanilamido - 5 - ethylisoxazole (245 parts by weight) as crystals melting at 152 to 153° C.

Example 3

To a solution of 3 - amino - 4 - bromo - 5 - methylisoxazole (65 parts by weight) in pyridine (150 parts by volume), there is added N,N' - bis(4 - chlorosulfonylphenyl) - urea (85 parts by weight), and the resultant mixture is heated at 40° C. for 1 hour. The reaction mixture is combined with water (2000 parts by volume). The separated substance is collected by filtration and washed with water to give N,N'-bis[4-(4-bromo-5-methyl-3-isoxazolysulfamoyl)-phenyl] - urea as crude crystals. The crystals are dissolved in 10% aqueous sodium hydroxide solution (2000 parts by volume) and refluxed for 2.5 hours. The reaction mixture is acidified with hydrochloric acid. The separated crystals are collected by filtration and recrystallized from ethanol to give 3-sulfanilamido-4-bromo-5-methylisoxazole (110 parts by weight) as crystals melting at 183 to 184° C.

Example 4

To a solution of 3-amino-4-iodo-5-methylisoxazole (80 parts by weight) in pyridine (150 parts by volume), there is added N,N'-bis(4-chlorosulfonylphenyl)-urea (90 parts by weight), and the resultant mixture is stirred at 15° C. for 10 minutes and at 50° C. for 30 minutes. The reaction mixture is combined with water (2000 parts by volume). The separated substance is collected by filtration and washed with water to give N,N'-bis[4-(4-iodo-5-methyl-3-isoxazolylsulfamoyl)-phenyl] - urea as crude crystals. The crystals are dissolved in 10% aqueous sodium hydroxide solution (2000 parts by volume) and refluxed for 3 hours. The reaction mixture is acidified with hydrochloric acid. The separated crystals are collected by filtration and recrystallized from ethanol to give 3-sulfanilamido-4-iodo - 5 - methylisoxazole (125 parts by weight) as crystals melting at 209 to 210° C. (decomp.).

Example 5

To a solution of 3-amino-4-iodo-5-methylisoxazole (80 parts by weight) in pyridine (150 parts by volume), there is added N,N'-bis(4-chlorosulfonylphenyl) - urea (85 parts by weight), and the resultant mixture is stirred at 15° C. for 10 minutes and at 50° C. for 30 minutes. The reaction mixture is combined with 10% aqueous sodium hydroxide solution (1000 parts by volume) and steam distilled for 30 minutes to remove pyridine. To the resultant mixture (2000 parts by weight), there is added sodium hydroxide (100 parts by weight), and the resulting mixture is refluxed for 2.5 hours. The reaction mixture is acidified with acetic acid. The separated crystals are collected by filtration and recrystallized from ethanol to give 3-sulfanilamido-4-iodo - 5 - methylisoazole (125 parts by weight) as crystals melting at 209 to 210° C. (decomp.).

What is claimed is:

1. A compound of the formula:

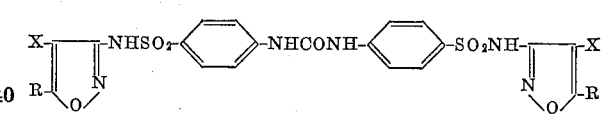

wherein R is a lower alkyl group and X is a halogen atom.

2. N,N'-bis[4-(4-iodo - 5 - methyl - 3 - isoxazolylsulfamoyl)-phenyl]-urea.

References Cited by the Examiner

UNITED STATES PATENTS 3,144,448   8/1964   Kano et al. _____ 260—239.9

OTHER REFERENCES

Kurzer, Chemical Reviews, volume 50, pages 19 to 20 (1952).

Galat, Ind. Eng. Chem., volume 36, page 192 (1944).

JOHN D. RANDOLPH, *Primary Examiner.*